United States Patent
Miyatake

(10) Patent No.: US 7,394,745 B2
(45) Date of Patent: Jul. 1, 2008

(54) OPTICAL PICKUP DEVICE AND OPTICAL DISK PLAYBACK DEVICE PROVIDED THEREWITH

(75) Inventor: Kenshou Miyatake, Osaka (JP)

(73) Assignee: Funai Electric Co., Ltd., Daito-shi (JP)

( * ) Notice: Subject to any disclaimer, the term of this patent is extended or adjusted under 35 U.S.C. 154(b) by 548 days.

(21) Appl. No.: 10/687,837

(22) Filed: Oct. 20, 2003

(65) Prior Publication Data

US 2004/0081057 A1    Apr. 29, 2004

(30) Foreign Application Priority Data

Oct. 18, 2002    (JP) ............................. 2002-303752

(51) Int. Cl.
*G11B 7/00*    (2006.01)
(52) U.S. Cl. ................. 369/112.01; 369/94; 369/112.03
(58) Field of Classification Search ................. None
See application file for complete search history.

(56) References Cited

U.S. PATENT DOCUMENTS

| | | | | |
|---|---|---|---|---|
| 5,526,336 A | * | 6/1996 | Park et al. ..................... 369/94 |
| 5,648,950 A | * | 7/1997 | Takeda et al. .......... 369/110.03 |
| 5,963,531 A | * | 10/1999 | Takahashi ................. 369/44.23 |
| 5,978,139 A | | 11/1999 | Hatakoshi et al. |

| | | | |
|---|---|---|---|
| 2003/0048737 A1 | * | 3/2003 | Nakamura et al. ..... 369/112.19 |

FOREIGN PATENT DOCUMENTS

| | | | |
|---|---|---|---|
| JP | 07302437 A | | 11/1995 |
| JP | 08-096406 | | 4/1996 |
| JP | 10149561 A | | 6/1998 |
| JP | 10302403 A | * | 11/1998 |
| JP | 2000-235733 | | 8/2000 |
| JP | 2000-298950 | | 10/2000 |
| JP | 2002-025098 | | 1/2002 |

* cited by examiner

*Primary Examiner*—Thang V. Tran
*Assistant Examiner*—Tawfik Goma
(74) *Attorney, Agent, or Firm*—Crowell & Moring LLP

(57) ABSTRACT

There is provided an optical pickup device comprising a laser light source for emitting a laser beam, an object lens for focusing the laser beam onto the recording surfaces of layers 0 and 1 of an optical disk and condensing the laser beam onto the recording surfaces, photodetectors for receiving the laser beam reflected by the optical disk, and a diffraction grating for diffracting a part of the reflected laser beam toward the photodetectors, wherein data can be simultaneously written to layers 0 and 1. The photodetector detects the reflected light from layer 0 after being refracted by the diffraction grating, and detects the reflected light from layer 1 without being refracted, so that the data of layers 0 and 1 can be simultaneously read. Thus, data can be simultaneously read from and written to the recording surfaces of a plurality of layers of an optical disk.

12 Claims, 4 Drawing Sheets

OPTICAL PICKUP DEVICE AND OPTICAL DISK PLAYBACK DEVICE PROVIDED THEREWITH

BACKGROUND OF THE INVENTION

1. Field of the Invention

The present invention relates to an optical pickup device for reading or writing information to an optical disk having recording surfaces of a plurality of layers, and to an optical disk playback device provided therewith.

2. Description of the Related Art

In recent years, greater recording capacity for optical disks had been required, and DVD (Digital Versatile Disk) and other optical disks obtained by laminating the recording surfaces of a plurality of layers have therefore come into practical use. In an optical disk recording and playback device for recording and playing back data to and from an optical disk having the recording surfaces of such a plurality of layers, as shown in FIG. 5, while an optical pickup device 500 for reading or writing data to an optical disk D is moved in the focus-adjusting direction as indicated by the arrow, an object lens 4 focuses a laser beam on one of the recording surfaces of the layers of the optical disk D (layer 0 or layer 1), and data is read or written, while an optical pickup device 500 for reading or writing data to an optical disk D is moved in the focus-adjusting direction as indicated by the arrow shown in FIG. 5. Therefore, the movement of the optical pickup device 500 is essential and data cannot be read in a short period of time when reading a large quantity of data recorded across a plurality of layers. In a similar manner, data cannot be written in a short period of time when writing a large quantity of data that must be recorded across a plurality of layers. In view of the above, techniques are being studied in which the reading speed and the writing speed can be increased, and the time required to write data can be shortened, by increasing the rotational drive speed of the optical disk D. Nevertheless, there are naturally limits to increasing the rotational speed of the optical disk D due to the need for noise elimination and to drawbacks in the reading precision and writing precision of the optical pickup device 500.

In view of the above, known optical disk recording and playback devices (refer to Japanese Patent Application Laid-open Nos. 2000-235733, and 2000-298950, for example) are structured such that two different pickups respectively corresponding to the recording surfaces of two layers of an optical disk are provided and optical pickup is separately performed for each recording surface in order to shorten the time required to write data without depending on higher rotational drive speeds of the optical disk. With such optical disk recording and playback devices, information can be simultaneously read from and simultaneously written to the recording surfaces of two layers, and the time required to read and write a large quantity of data across two layers can be shortened.

There are also optical pickup devices (refer to Japanese Patent Application Laid-open No. HEI 8-96406, for example) in which defocusing aberration of a predetermined value or more and spherical aberration of a predetermined value or less are maintained and an increase in recording density is attempted by optimizing the distance and refractive index in transmission between the recording surfaces of the optical disk, the number of layers of the recording surfaces, the numerical aperture of the object lens in the optical pickup device, and the wavelength of a laser beam directed to the optical disk.

There are also optical pickup devices (refer to Japanese Patent Application Laid-open No. 2002-25098, for example) in which the leakage (crosstalk between the layers) of the laser beam between the recording surfaces of the plurality of layers is reduced and a reduction in the noise during the reading and writing of data is attempted by optimizing the size of the photodetector for detecting the laser beam reflected by the optical disk.

SUMMARY OF THE INVENTION

However, the optical disk playback and recording devices disclosed in Japanese Patent Application Laid-open Nos. 2000-235733 and 2000-298950 require a number of optical pickup devices according to the lamination number of recording surfaces on the optical disk, the structure of the optical disk playback and recording device becomes more complicated, the manufacturing cost of the device markedly increases, and the device cannot be made smaller.

In addition, the time required to read and write a large quantity of data across the recording surfaces of a plurality of layers cannot be shortened if the optical pickup devices disclosed in Japanese Patent Application Laid-open Nos. HEI 8-96406 and 2002-25098 are used.

The present invention was contrived to solve the problems described above, and an object thereof is to provide an optical pickup device that has an inexpensive and compact structure and is capable of simultaneously reading and writing data to the recording surfaces of a plurality of layers of an optical disk, and an optical disk playback device that is provided therewith.

To achieve the above-stated object, an aspect of the present invention provides an optical pickup device for writing data or reading data recorded on an optical disk, said optical pickup device comprises: a laser light source for emitting a laser beam for writing data or reading data; photodetectors having light-receiving portions for respectively receiving the laser beam reflected by the recording surfaces of a plurality of layers of the optical disk; and an optical system having a light condensing element for condensing the laser beam emitted from the laser light source onto the recording surfaces of the optical disk, and a light guide element for selectively guiding the laser beam reflected by the recording surfaces of the optical disk to any of the light-receiving portions; wherein the light condensing element condenses the laser beam emitted from one laser light source onto the recording surfaces of layers of the optical disk, and forms an image at a plurality of focal distances that vary in steps, and the surfaces on which images are thereby formed correspond to the recording surfaces of layers of the optical disk; and the light guide element guides reflected light reflected by the recording surfaces of the layers to a plurality of light-receiving portions, so as to simultaneously read or write data to the recording surfaces of the layers.

In this configuration, data can be simultaneously read or written to the recording surface of each layer with the aid of a single optical pickup device, then a large quantity of data can be read or written in a short period of time.

In the optical pickup device, the light condensing element may be a hologram for condensing the laser beam emitted from the laser light source and focusing the laser beam on the recording surfaces of the layers of the optical disk.

In this configuration, the optical pickup device can be easily structured because in this structure the laser beam emitted from the laser light source can be condensed by a hologram onto the recording surface of each layer of the optical disk.

Another aspect of the present invention provides an optical pickup device for writing data or reading data recorded on an optical disk, said optical pickup device comprises: a laser light source for emitting a laser beam for writing data or reading data; photodetectors having light-receiving portions for respectively receiving the laser beam reflected by the recording surfaces of a plurality of layers of the optical disk; and an optical system for guiding to the optical disk the laser beam emitted from the laser light source, and guiding to the photodetectors the laser beam reflected by the optical disk; said optical system having: a half mirror for reflecting or transmitting a laser beam emitted from the laser light source, and transmitting or reflecting the light reflected from the optical disk; a collimator lens for converting the laser beam reflected or transmitted by the half mirror into parallel light; an object lens for condensing the laser beam converted to parallel light by this collimator lens onto the recording surfaces of the optical disk, having a curvature or refractive index that varies by steps in the radial direction, and comprising a multifocal lens for focusing on a plurality of recording surfaces of the optical disk, and a diffraction grating for diffracting a part of the laser beam penetrated or reflected by the half mirror and guiding the laser beam to any of the light-receiving portions; wherein the object lens condenses the laser beam emitted from one laser light source onto the recording surfaces of the multiple layers of the optical disk, and the diffraction grating guides reflected light reflected by the recording surfaces of the layers to a plurality of light-receiving portions, so as to simultaneously read or write data to the recording surfaces of the layers.

In this configuration, a large quantity of data can be read and written in a short period of time, and the cost and size of a recording and playback device can be reduced because in this structure, data can be read from and written to the recording surfaces of a plurality of layers by means of a single optical pickup device with a simple structure using an optical system having a diffraction grating and an object lens with a plurality of focal points.

An optical disk playback device comprises: the optical pickup device; playback means for simultaneously reading data recorded on the recording surfaces of a plurality of layers of an optical disk by means of the optical pickup device and playing back the data of one of the recording surfaces; and storage means for saving the data of the other recording surface.

In this configuration, the wait time required for moving the optical pickup device is dispensed with, and transition from replaying data on one recording surface to replaying data on another recording surface can be performed smoothly without pause because in this structure the data on the other recording surface, which is saved in succession in a storage means, can be instantly replayed after replay of the data on the one recording surface is completed.

DESCRIPTION OF THE PREFERRED EMBODIMENTS (Embodiment 1)

Figure 1:
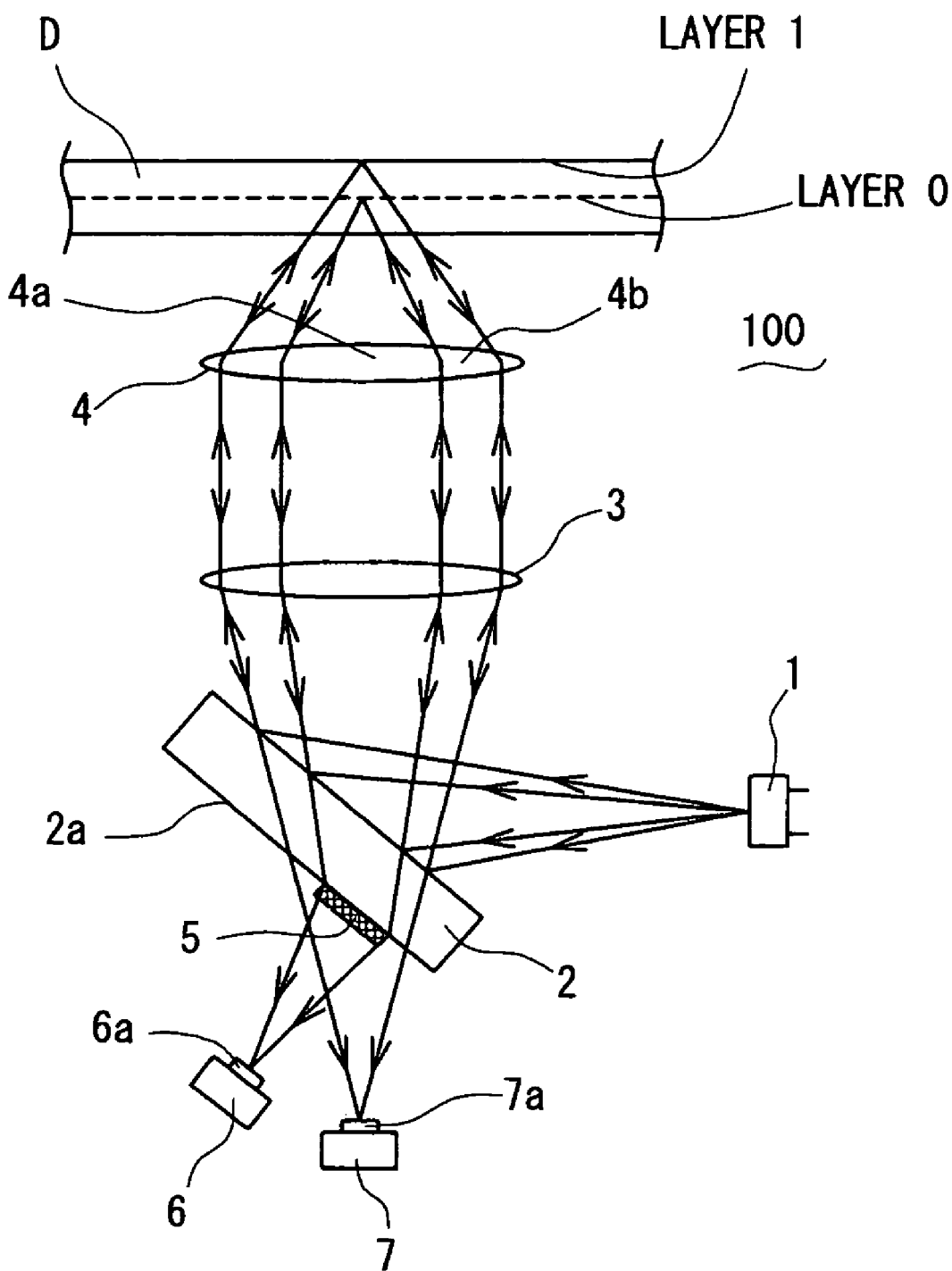
FIG. 1 is a diagram showing a structure of an optical pickup device to which the optical disk recording and playback device according to an embodiment of the present invention has been applied.

An optical pickup device according to an embodiment of the present invention is described with reference to the drawings. FIG. 1 shows a structure of the optical pickup device. The optical pickup device 100 is a device mounted in an optical disk recording and playback device and used to read and write data to an optical disk D. The device comprises a laser diode (laser light source) 1 for emitting a laser beam, a half mirror 2 for directing the laser beam emitted from the laser diode 1 toward the optical disk D and transmitting the laser beam reflected by the recording surface of the optical disk D, a collimator lens 3 for converting the laser beam reflected by the half mirror 2 into parallel light, an object lens 4 for condensing the laser beam that has been converted to parallel light by the collimator lens 3 onto the recording surface of the optical disk D, a diffraction grating 5 for diffracting a part of the laser beam that is transmitted through the half mirror 2, and photodetectors 6 and 7 for receiving the laser beam transmitted through the half mirror 2 and the laser beam diffracted by the diffraction grating 5. The optical system of the optical pickup device 100 comprises the half mirror 2, collimator lens 3, object lens 4, and diffraction grating 5. This optical pickup device 100 is structured so as to be compatible with a DVD or other optical disk D obtained by laminating the recording surfaces of two layers (layer 0 and layer 1), and to be capable of simultaneously reading and writing data to layer 0 and layer 1.

The object lens 4 has a curvature or a refraction index that varies in steps in the radial direction, and is a bifocal lens formed so that the focusing the laser beam can be done on the recording surfaces of layer 0 and layer 1 of the optical disk D. In other words, the laser beam transmitted through the central area 4a of the object lens 4 is condensed onto the recording surface of layer 0, and the laser beam transmitted through the outside area 4b of the object lens 4 is condensed onto the recording surface of layer 1. The photodetectors 6 and 7 have light-receiving portions 6a and 7a for receiving the laser beam, and are disposed so as to receive the laser beam reflected by the recording surfaces of layer 0 and layer 1. It is also possible to use a structure in which a single detector provided with two light-receiving portions is provided instead of the two photodetectors 6 and 7.

A diffraction grating 5 is mounted on the emission surface 2a side of the half mirror 2 in the vicinity of the optical axis of the laser beam transmitted through the half mirror 2. The diffraction grating 5 diffracts the laser beam reflected by the recording surface of layer 0 toward the light-receiving portion 6a of the photodetector 6. In the present embodiment, a hologram for condensing the laser beam on the light-receiving portion 6a of the photodetector 6 may be used instead of the diffraction grating 5. The photodetector 6 photoelectrically converts the laser beam diffracted by the diffraction grating 5 into an electric signal. The photodetector 7 photoelectrically converts the laser beam reflected by the recording surface of layer 1 into an electric signal.

The data writing operation in the optical pickup device 100 constituted as noted above is described below. The laser beam that is emitted from the laser diode 1 is reflected by the half mirror 2, transmitted through the collimator lens 3, and directed to the object lens 4. The laser beam that is transmitted through the central area 4a of the object lens 4 is condensed onto the recording surface of layer 0, and the laser beam that is transmitted through the outside area 4b of the object lens 4 is condensed onto the recording surface of layer 1. This allows data to be simultaneously written to the recording surfaces of layer 0 and layer 1.

The data reading operation is described next. When reading data, the laser beam is emitted from the laser diode 1 in the same manner as when data is written. However, the output of the laser diode 1 is somewhat weakened in comparison with writing data. The laser beam condensed on the recording surface of layer 0 by the central area 4a of the object lens 4 is reflected by the recording surface of layer 0, transmitted through the object lens 4, collimator lens 3, and half mirror 2, then diffracted by the diffraction grating 5, and detected (photoelectrically converted) by the photodetector 6. The laser beam condensed by the outside area 4b of the object lens 4 to the recording surface of layer 1 is reflected by layer 1, transmitted through the object lens 4, collimator lens 3, and half mirror 2, and thereafter detected by the photodetector 7. This allows data to be simultaneously read from the recording surfaces of layers.

The electric signals that are photoelectrically converted by the photodetectors 6 and 7 are processed by a signal processing circuit (not depicted) provided separately to the optical disk recording and playback device, and images and/or audio is played back. In addition, the optical disk recording and playback device of the present embodiment is provided with a memory (memory means; not depicted) for storing electric signals that are photoelectrically converted by the photodetectors 6 and 7, and the signal processing circuit saves the data of the other recording surface (layer 1) in the memory when data from one recording surface (layer 0, for example) is played back. When the playback of data from layer 0 is completed, the data from the recording surface of layer 1 saved in the memory is immediately played back. The operation of the signal processing circuit and memory is controlled by the control unit (not depicted) of the optical disk recording and playback device. In the case that the data recorded on the other layer is large, a hard disk or other high-capacity memory means may be used instead of memory.

Thus, according to the present optical pickup device 100, it is possible to simultaneously read and write data to the recording surfaces of layers of an optical disk D, and to reduce the cost and size of an optical disk recording and playback device capable of reading and writing a large quantity of data in a short period of time.

When the playback of the data from layer 0 is complete, and the data on the recording surface of layer 1 is subsequently played back in succession, the data from layer 1 that is saved in memory is immediately played back without being accompanied by the movement of the optical pickup device 100. The wait time required to move the optical pickup device 100 can therefore be dispensed with, and transition from playing back data from layer 0 to playing back data from layer 1 can be smoothly performed without pause.

If the data is recorded to the optical disk D in a manner shown below, this data cannot be played back without the aid of the optical pickup device 100 according to the present invention. Images, audio, and other types of authorized data protected in a specific way can be written to layer 0, and a protection code that serves as a key for releasing the protection for the data on layer 0 can be written to layer 1. During playback, the protection code on layer 1 is simultaneously read while the images or other data on layer 0 are read, the protection of data read from layer 0 is released by means of the protection code thus read, and images or other data are played back. Thus, by recording normal, protected data on layer 0, and a protection code for releasing the protection on layer 1, the normal data recorded on layer 0 cannot be played back without relying on the optical pickup device 100 according to the, present invention, and illegal disk copying and distribution can be forestalled.

(Embodiment 2)

Figure 2:
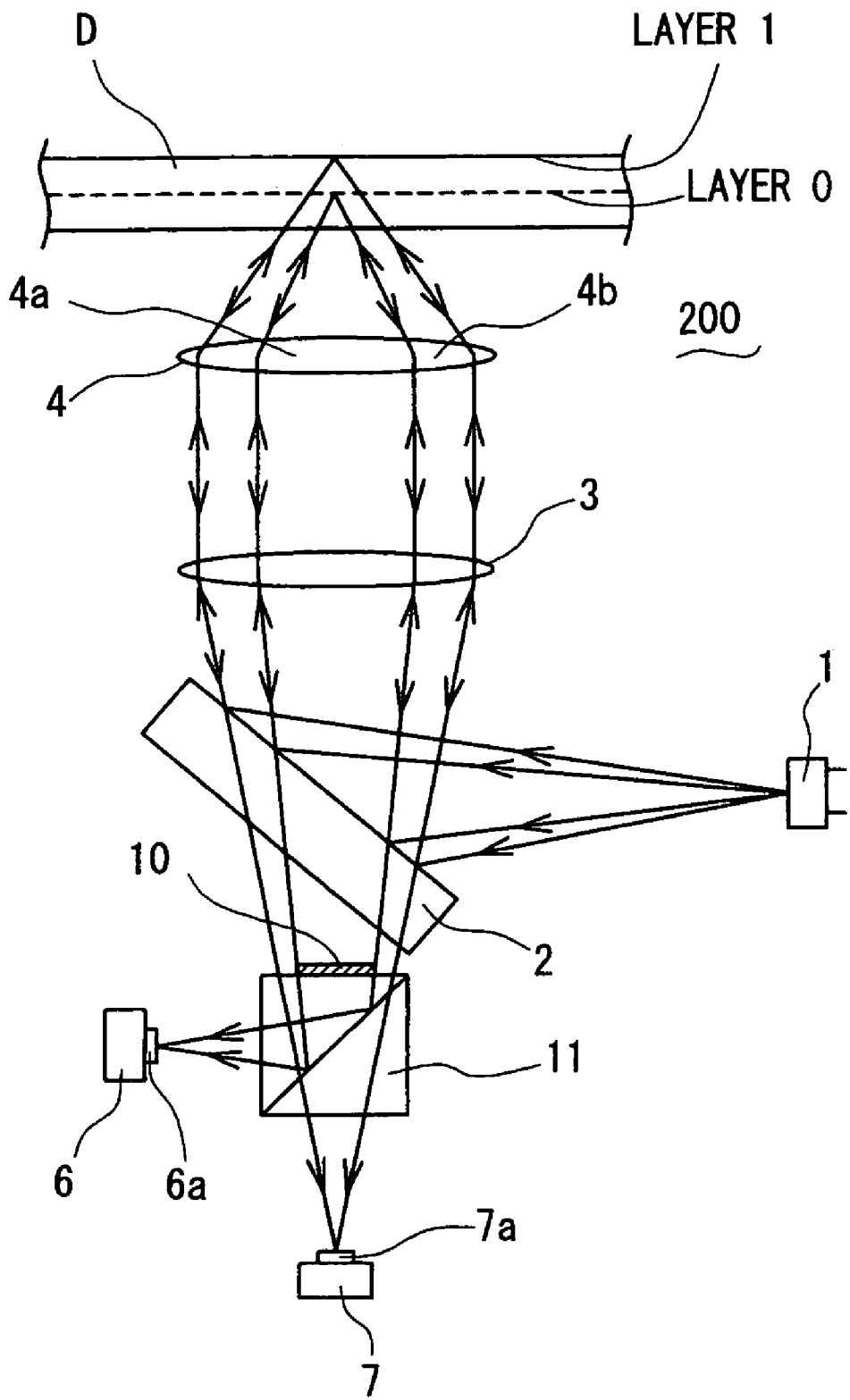
FIG. 2 is a diagram showing a structure of another optical pickup device of the present invention.

The optical pickup device according to another embodiment of the present invention is described below with reference to FIG. 2. The optical pickup device 200 comprises a laser diode 1, a half mirror 2, a collimator lens 3, an object lens 4, and photodetectors 6 and 7, and further comprises a half-wave plate 10 for changing the direction of the laser beam reflected by the recording surface of layer 0 by 90°, and a polarized beam splitter 11 for reflecting the laser beam that is transmitted through the half-wave plate 10 in the direction of the photodetector 6 and transmitting the laser beam reflected by the recording surface of layer 1.

The data writing operation in the optical pickup device 200 constituted as noted above is performed in the same manner as in the optical pickup device 100. The data reading operation in the optical pickup device 200 is described below. The laser beam condensed on the recording surface of layer 0 by the central area 4a of the object lens 4 is reflected by the recording surface of layer 0, transmitted through the object lens 4, collimator lens 3, and half mirror 2, then directionally changed 90° by the half-wave plate 10, and directed to the polarized beam splitter 11. This laser beam is directionally changed by 90° by the half-wave plate 10, and is therefore reflected by the polarized beam splitter 11, directed to the light-receiving portion 6a of the photodetector 6, and detected. The laser beam condensed on the recording surface of layer 1 by the outside area 4b of the object lens 4 is reflected by the recording surface of layer 1, transmitted through the object lens 4, collimator lens 3, half mirror 2, and the polarized beam splitter 11, then directed to the light-receiving portion 7a of the photodetector 7, and detected. Thus, data can be simultaneously read from the recording surfaces of layer 0 and layer 1. In this manner, the same effect can be obtained with the optical pickup device 200 as with the optical pickup device 100.

(Embodiment 3)

Figure 3:
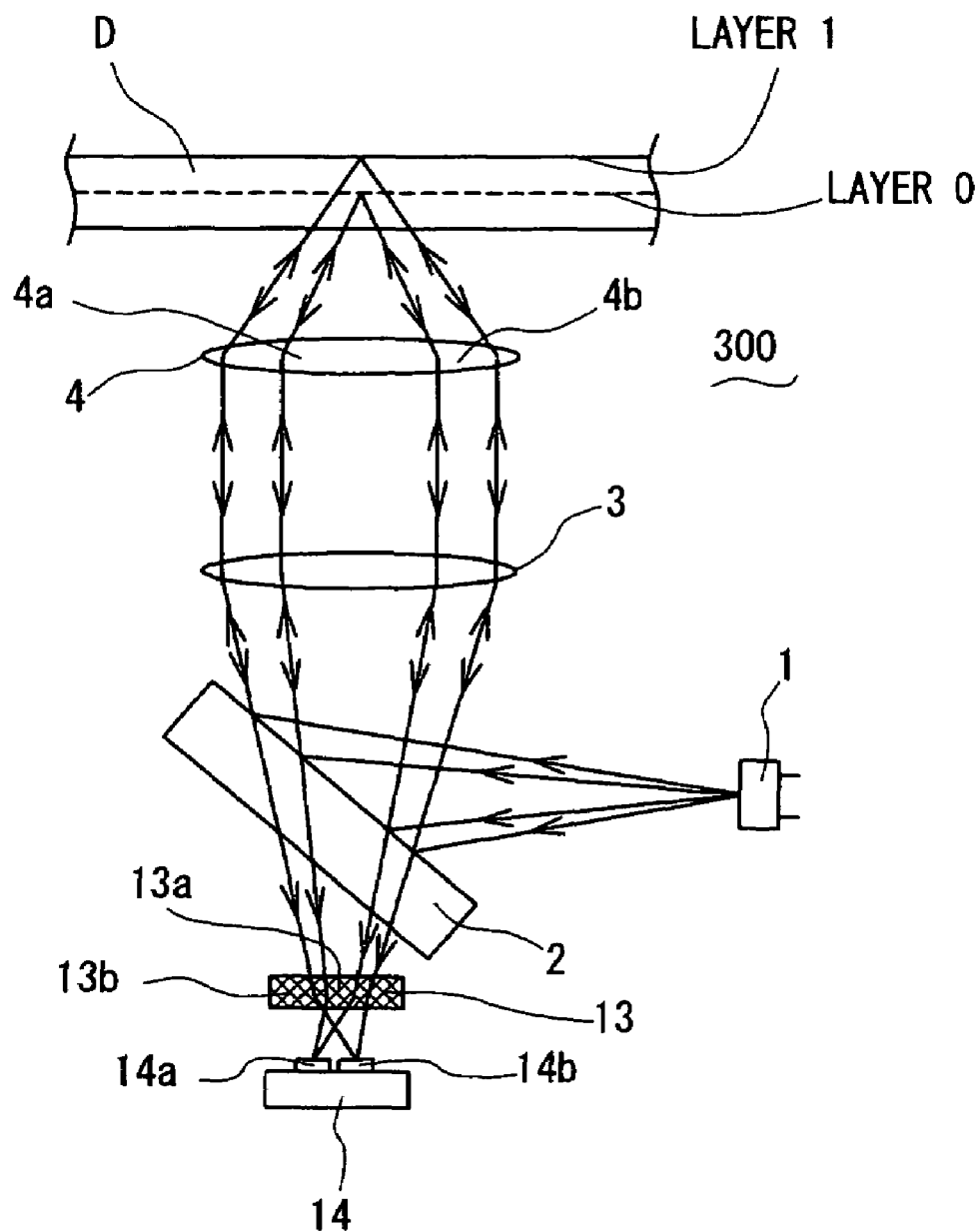
FIG. 3 is a diagram showing a structure of further another optical pickup device of the present invention.

The optical pickup device according to further another embodiment of the present invention is described below with reference to FIG. 3. The optical pickup device 300 comprises a laser diode 1, a half mirror 2, a collimator lens 3, and an object lens 4, and further comprises a diffraction grating 13 for diffracting the laser beam reflected by layer 0 and the laser beam reflected by layer 1 in different directions, and a photodetector 14 having light-receiving portions 14a and 14b for receiving the laser beams diffracted in different directions by the diffraction grating 13. The diffraction grating 13 has different grating shapes in the central area 13a into which the reflected laser beam is reflected by the layer 0, and in the outside area 13b into which the reflected laser beam is reflected by the layer 1. In the present embodiment, a hologram for condensing the laser beam toward the light-receiving portions 14a and 14b of the photodetector 14 may be used instead of the diffraction grating 13.

The data writing operation in the optical pickup device 300 constituted as noted above is performed in the same manner as in the optical pickup device 100. The data reading operation in the optical pickup device 300 is described below. The laser beam condensed on the recording surface of layer 0 by the central area 4a of the object lens 4 is reflected by the recording surface of layer 0, transmitted through the object lens 4, collimator lens 3, and half mirror 2, then diffracted by the central area 13a of the diffraction grating 13 in the direction of the light-receiving portion 14a, and detected by the light-receiving portion 14a. Meanwhile, the laser beam condensed on the recording surface of layer 1 by the outside area 4b of the object lens 4 is reflected by the recording surface of layer 1, transmitted through the object lens 4, collimator lens 3, and half mirror 2, then diffracted by the outside area 13b of the diffraction grating 13 in the direction of the light-receiving portion 14b, and detected by the light-receiving portion 14b. Thus, data can be simultaneously read from the recording surfaces of layer 0 and layer 1. In this manner, the same effect can be obtained with the optical pickup device 300 as with the optical pickup device 100.

Figure 4:
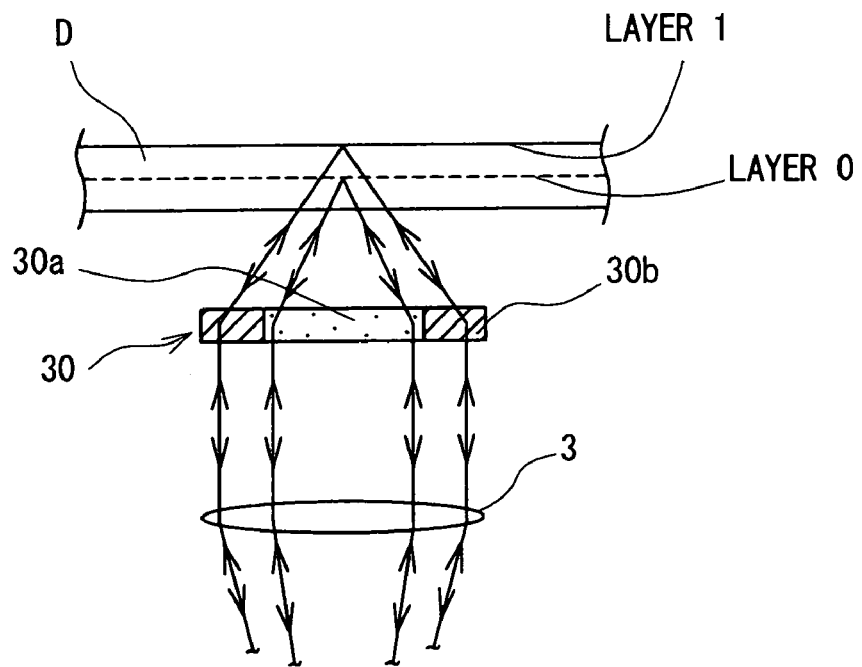
FIG. 4 is a diagram showing a hologram used in the present invention.
Figure 5:
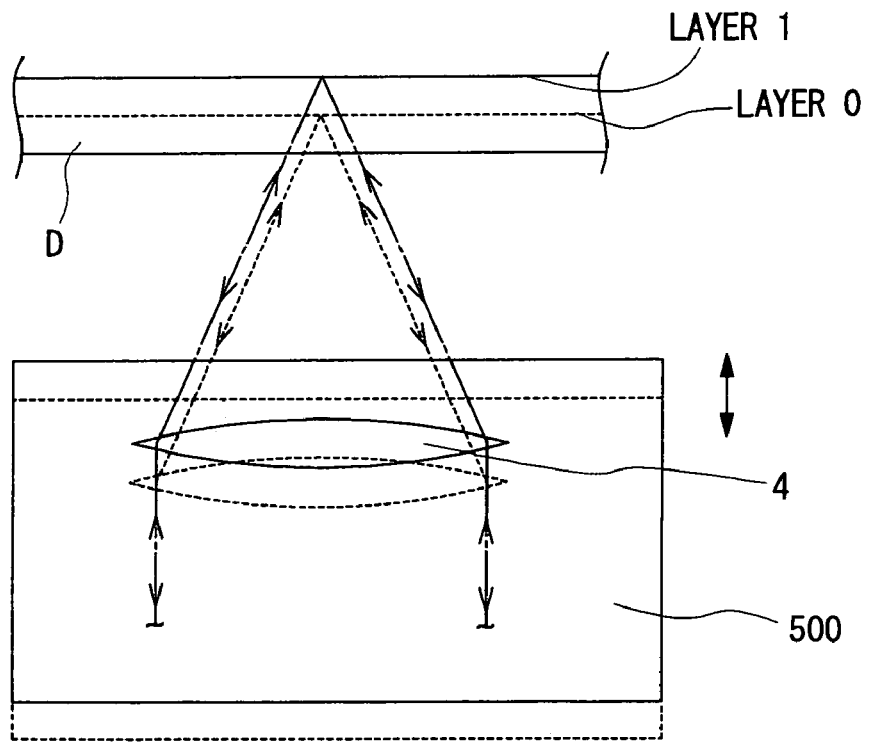
FIG. 5 is a diagram showing an operation of a conventional optical pickup device.

The present invention can be modified in a variety of ways without being limited to the structure of the above-described embodiments, and the same operation and effect can be obtained by the use of a hologram 30 such as that shown in FIG. 4 in lieu of the object lens 4. This hologram 30 is formed by varying the distribution of the image formation surface in two steps from the central area 30a across to the outside area 30b. The laser beam transmitted through the collimator lens 3 is therefore condensed on the recording surface of layer 0 and the recording surface of layer 1 by the hologram 30.

The present invention is also compatible with optical disks obtained by laminating the recording surfaces of three or more layers. In this case, the number of installed photodetectors and the number of the focal points of the object lens should be increased to correspond to the lamination number of the recording surfaces. The optical pickup devices 100, 200, and 300 may be configured such that the laser beam emitted from the laser diode 1 is sequentially transmitted through the half mirror 2, collimator lens 3, and object lens 4, and the laser beam reflected by the optical disk D is reflected by the half mirror 2. The optical pickup devices 100, 200, and 300 are not limited to optical disk recording and playback devices, and may also be applied to playback devices.

This application is based on Japanese patent application No. 2002-303752 filed in Japan dated Oct. 18, 2002, the contents of which are hereby incorporated by references.

What is claimed is:

1. An optical pickup device for writing data or reading data recorded on an optical disk, said optical pickup device comprising:
a laser light source for emitting a laser beam for writing data or reading data;
photodetectors having light-receiving portions for respectively receiving a laser beam reflected by recording surfaces of a plurality of layers of the optical disk; and
an optical system for guiding to the optical disk the laser beam emitted from the laser light source, and guiding to the photodetectors the laser beam reflected by the optical disk;
said optical system having:
a half mirror for reflecting or transmitting a laser beam emitted from the laser light source, and transmitting or reflecting the light reflected from the optical disk;
a collimator lens for converting the laser beam reflected or transmitted by the half mirror into parallel light;
an object lens for condensing the laser beam converted to parallel light by the collimator lens onto the recording surfaces of the optical disk, having a curvature or refractive index that varies by steps in the radial direction, and comprising a multifocal lens for focusing on recording surfaces of the optical disk; and
a diffraction grating for diffracting a part of the laser beam transmitted through the half mirror and guiding the laser beam to at least one of the light-receiving portions; wherein
the object lens condenses the laser beam emitted from the laser light source onto the recording surfaces of the optical disk, and
the diffraction grating guides light reflected by the recording surfaces to a plurality of light-receiving portions, so as to simultaneously read or write data to the recording surfaces, and the diffraction grating being spatially separated from the half mirror.

2. An optical disk playback device comprising:
the optical pickup device according to claim 1;
playback means for simultaneously reading data recorded on recording surfaces of a plurality of layers of an optical disk by means of the optical pickup device and playing back data of one of the recording surfaces; and
storage means for saving data of another of the recording surfaces.

3. The optical pickup device of claim 1, wherein the collimator lens is interposed between the half mirror and the optical disk and wherein the object lens is interposed between the collimator lens and the optical disk.

4. The optical pickup device of claim 1, wherein the diffraction grating is arranged on a beam splitter.

5. An optical pickup device comprising:
a laser light source that emits a laser beam for writing data or reading data;
a photodetector having light-receiving portions that respectively receive a laser beam reflected by recording surfaces of a plurality of layers of the optical disk; and
an optical system that guides the laser beam to the optical disk, and guides the laser beam reflected by the optical disk to the photodetector, the optical system comprising
a half mirror that reflects or transmits a laser beam emitted from the laser light source, and transmits or reflects the light reflected from the optical disk;
a collimator lens that converts the laser beam reflected or transmitted by the half mirror into parallel light, and that converts the laser beam reflected by the optical disk from a parallel light into a non-parallel light;
an object lens that condenses the laser beam converted to parallel light by the collimator lens onto the recording surfaces of the optical disk, having a curvature or refractive index that varies by steps in the radial direction, and comprising a multifocal lens that focuses on recording surfaces of the optical disk; and
a diffraction grating that diffracts a part of the laser beam transmitted through the half mirror and guides the laser beam to one of the light-receiving portions of the photodetector, wherein the diffraction grating guides light reflected by the recording surfaces to one of the light receiving portions, so as to simultaneously read or write data to the recording surfaces.

6. The optical pickup device of claim 5, wherein the diffraction grating is attached to the half mirror.

7. The optical pickup device of claim 5, wherein the diffraction grating is spatially separate from the half mirror.

8. The optical pickup device of claim 7, further comprising:
a beam splitter, wherein the diffraction grating is attached to the beam splitter.

9. The optical pickup device of claim 5, wherein the photodetector is a first and second photodetector, each having a light receiving portion.

10. An optical disk playback device comprising:
a laser light source that emits a laser beam for writing data to an optical disk or reading data from the optical disk;
photodetectors having light-receiving portions that respectively receive a laser beam reflected by recording surfaces of a plurality of layers of the optical disk;
a half mirror, arranged between the laser light source and photodetectors, that reflects or transmits a laser beam emitted from the laser light source, and transmits or reflects the light reflected from the optical disk;

a collimator lens that converts the laser beam reflected or transmitted by the half mirror into parallel light;

an object lens that condenses the laser beam converted to parallel light by the collimator lens onto the recording surfaces of the optical disk, wherein the object lens is a multifocal lens that focuses on recording surfaces of the optical disk and has a curvature or refractive index that varies by steps in the radial direction; and a diffraction grating, arranged between the photodetectors and the half mirror and spatially separated from the half mirror, that diffracts a part of the laser beam transmitted through the half mirror and guides the laser beam to at least one of the light-receiving portions, wherein the diffraction grating guides light reflected by the recording surfaces to a plurality of light-receiving portions, so as to simultaneously read or write data to the recording surfaces.

11. The optical disk playback device of claim 10, wherein the collimator lens is interposed between the half mirror and the optical disk and wherein the object lens is interposed between the collimator lens and the optical disk.

12. The optical disk playback device of claim 11, comprising:

playback means for simultaneously reading data recorded on recording surfaces of a plurality of layers of an optical disk by means of the optical pickup device and playing back data of one of the recording surfaces; and storage means for saving data of another of the recording surfaces.

* * * * *